June 26, 1956
J. W. DOWNS
2,752,593
INITIATING AND TIMING CIRCUIT FOR
A DOPPLER TYPE CHRONOGRAPH
Filed Oct. 11, 1951
2 Sheets-Sheet 1
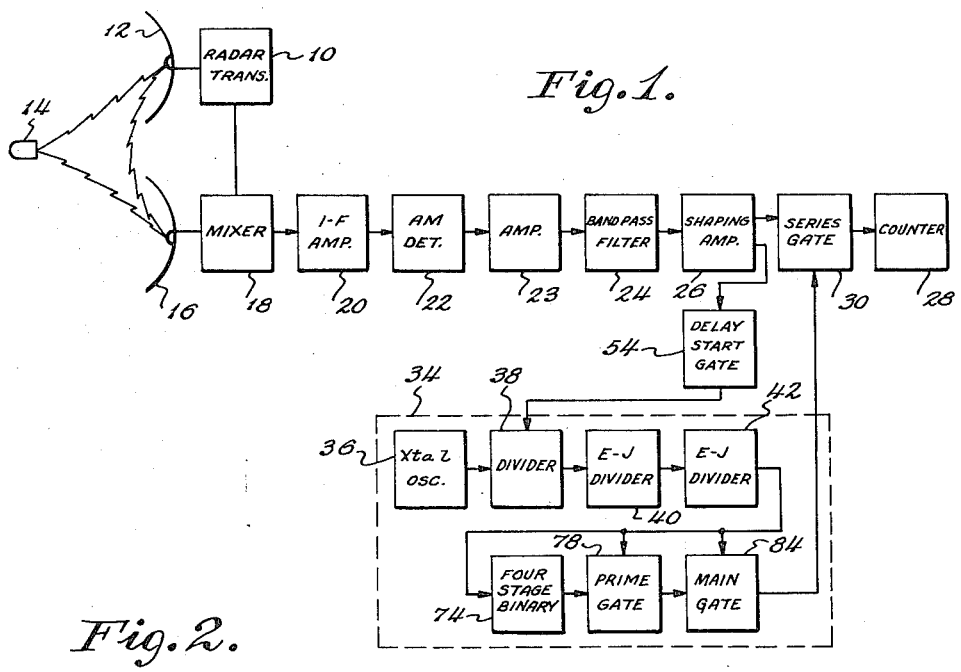
Fig.1.
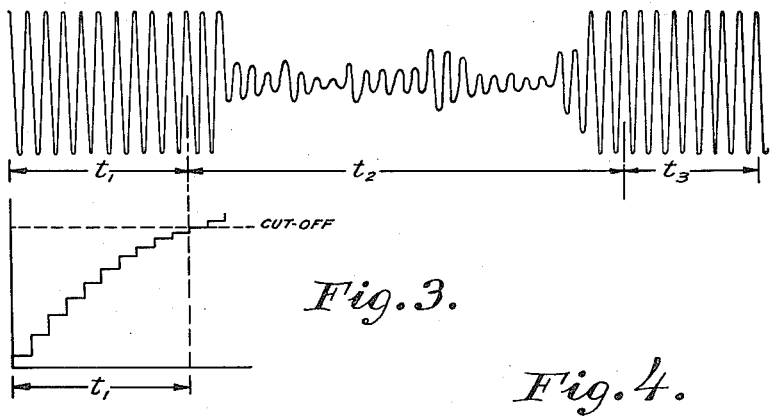
Fig.2.
Fig.3.
Fig.4.
INVENTOR
JOHN W. DOWNS
BY
Paul B. Hunter
ATTORNEY

United States Patent Office 2,752,593
Patented June 26, 1956

2,752,593

INITIATING AND TIMING CIRCUIT FOR A DOPPLER TYPE CHRONOGRAPH

John W. Downs, Glen Cove, N. Y., assignor to Sperry Rand Corporation, a corporation of Delaware Application October 11, 1951, Serial No. 250,887

17 Claims. (Cl. 343—8)

The present invention relates to a Doppler type chronograph for artillery, and, more particularly, to a starting and timing circuit for automatically making an accurate velocity determination a preselected time interval after the gun is fired.

The frequency shift, in accordance with the Doppler principle, of a high frequency radio signal reflected from a moving object has been utilized to accurately measure the velocity of that object toward or away from the radar source. One application of this velocity measuring system has been in the determination of the muzzle velocity of projectiles, for example, fired from an anti-aircraft gun. The radio signal reflected by the projectile is reduced in frequency from the transmitted signal. The difference between the frequencies of the transmitted and reflected signals, designated as the Doppler frequency, is directly proportional to the velocity of the projectile. An accurate determination of this velocity is obtained by counting the cycle occurring at the Doppler frequency in a fixed interval of time, the number of cycles being a convenient measure of the velocity of the projectile.

It is particularly desirable the the chronograph operate in such a manner that it will automatically take a velocity measurement whenever the next projectile is fired from the gun following the priming of the chronograph. There may be considerable delay in the firing of the gun after the chronograph is primed. During this time the transmitter is continuously sending forth energy with the receiver and counter in standby operation read to receive a reflected signal from the projectile the moment it emerges from the gun barrel.

Certain difficulties exist in the operation of the chronograph in the above described manner. One difficulty is that the triggering of the counter occurs prematurely because of spurious external signals picked up by the receiver during the standby period. For example, moving objects such as an airplane passing by, a person walking around the gun, movement of the gun barrel, etc., produce reflected signals which trigger the counter before the gun is fired. In addition, because the receiver is highly sensitive, externally or internally generated noise signals may likewise trigger the counter while the receiver is in standby condition. Random noise signals generated in the various components of the radar receiver in a manner inherent in electronic circuits are apt to produce false counts. As a result, the chronograph counter is prematurely triggered giving spurious velocity readings or no readings at all.

Another difficulty in measuring the velocity of the projectile by the frequency shift of the signal reflected by the projectile as it leaves the gun results from the ionized gases constituting the familiar "flash" accompanying the firing of a shell. This "flash" of ionized gases is essentially opaque to the transmitted radio signal and therefore obscures the projectile until the gases dissipate. The time interval following the emergence of the projectile from the gun, but prior to emergence of the flash gases, is too short to readily obtain an accurate velocity measurement. Therefore, it is desirable that some time delay be introduced into the velocity measuring system to permit the dissipation of the flash gases before a velocity measurement is actually made.

It is a general object of this invention to avoid and overcome the foregoing and other difficulties in and objections to prior art practices by the provision of a chronograph which is extremely accurate, reliable in its operation, and easily installed for use.

Another object of this invention is the provision of a Doppler type chronograph which automatically triggers when the gun is fired.

Another object of this invention is to provide a chronograph which is only triggered by movement of the projectile as it leaves the barrel of the gun.

Another object of this invention is the provision of a time delay circuit in combination with a chronograph, which delays the velocity determination a fixed period of time to permit dissipation of flash gases.

Another object of this invention is the provision of a chronograph which is triggered by an integrating-type step counter responsive to the Doppler signal received when the projectile first emerges from the gun.

Another object of this invention is to provide an accurate timing circuit in combination with a chronograph which generates a fixed time delay after being triggered, followed by an accurately determined counting interval during which the counter circuit is actuated for counting Doppler cycles.

These and other objects of the invention which will become apparent as the description proceeds are achieved by the provision of a chronograph for measuring the velocity of a projectile fired from a gun, the chronograph comprising means for transmitting and receiving a high frequency radio wave reflected by the projectile in flight. The receiver includes means for producing a Doppler signal having a frequency equal to the difference in frequency between the transmitted and received signals, the shift in frequency according to the Doppler principle being directly proportional to the velocity of the projectile. A counter directly counts the cycles of the Doppler signal during a fixed time interval to indicate the projectile velocity. An integrating-type step counter, responsive to ten or fifteen successive cycles of the Doppler signal initially present after the firing of the gun and before the obliteration of the reflected signal by the flash gases, initiates an accurate, crystal-controlled timing and switching circuit which connects the Doppler output signal of the receiver to the counter. The timing and switching circuit provides a time delay just sufficient to permit dissipation of the flash gases and then gates the Doppler signal to the counter for an accurate, predetermined time interval.

For a better understanding of the invention, reference should be made to the accompanying drawings, wherein:

Fig. 1 is a block diagram of the complete chronograph circuit;

Fig. 2 is a graphical representation of the Doppler signal from the time the projectile first emerges from the gun barrel;

Fig. 3 is a graphical representation of the charging action of the step counter as initiated by the first Doppler cycles;

Fig. 4 is a graphical representation of the wave shapes at various stages of the timing circuit.

Figure 5:
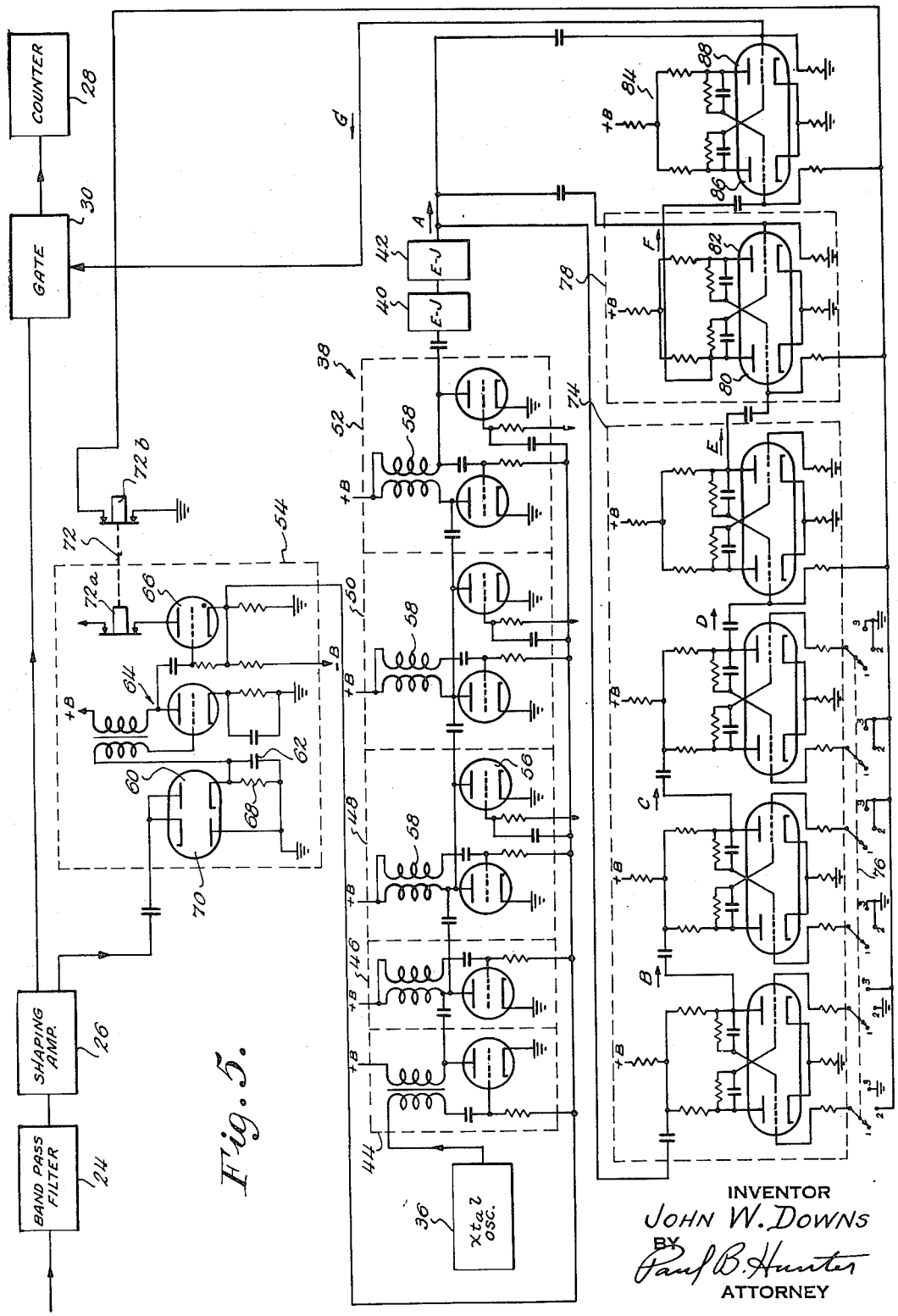
Fig. 5 is a schematic diagram of the step counter and timing circuits.

With particular reference to the form of the invention illustrated in the drawings by Fig. 1, the numeral 10 indicates generally a high frequency radio transmitter, the output of which is coupled to an antenna 12. The transmitter is preferably designed to generate a carrier signal having a frequency of 10,000 megacycles. The transmitting antenna 12 is so positioned relative to a gun (not shown) whose muzzle velocity is being measured that as a projectile 14 emerges from the gun, the transmitted signal is reflected therefrom back to a receiving antenna 16. The transmitting antenna 12 and receiving antenna 16 are preferably mounted adjacent each other.

The frequency of the reflected signal is shifted in accordance with the Doppler principle by an amount proportional to the velocity of the projectile 14. With this frequency shift designated by $f_d$, the signal received at the antenna 16 is of a frequency of 10,000 megacycles minus $f_d$. In addition, there is a small leakage signal of 10,000 megacycles from the transmitting antenna 12 at the receiving antenna 16.

The signal at the receiver antenna is mixed with a local mixer frequency signal of 9,966 megacycles, which is derived from the transmitter 10. The transmitter is crystal controlled so that the transmitting frequency and mixer frequency are accurately maintained. The receiver input signal and the local signal are heterodyned in the mixer circuit 18 in a conventional manner characteristic of the superheterodyne-type receiver to produce the intermediate frequency having a 34 megacycle component, a $34+f_d$ megacycle component, and a $34-f_d$ megacycle component. It will be appreciated that the intermediate frequency signal is essentially a carrier signal of 34 megacycles modulated by the Doppler frequency of $f_d$. The intermediate frequency signal is amplified by suitable amplifying means 20 and applied to an amplitude modulation detector 22, the output signal of which is the Doppler signal having a frequency $f_d$.

The Doppler signal at the output of the detector 22 is shown in graphical form in Fig. 2. During the interval $t_1$ some 10 or 15 Doppler cycles are received by reflection of the radar signal from the projectile 14. Following this, during an interval of time $t_2$, the projectile is obscured by the flash gases emerging from the gun barrel so that only a noise signal is present at the receiver antenna. As the flash gases are dissipated, the Doppler signal is once more established at the receiver and continues as long as the projectile is within range. The time $t_2$ during which the Doppler signal is obscured varies with different sizes of guns. For example, a 120 millimeter gun is found to have a flash gas dissipation time of approximately .20 second, while a 90 millimeter gun has a flash period of .15 second.

The Doppler signal at the output of the detector 22 is amplified at 23 and applied to a band pass filter 24. The band pass filter 24 is designed to pass frequencies of the order of 38 to 84 kc. and to reduce spurious noise signals outside this frequency range, thus eliminating Doppler cycles due to moving objects other than the projectile and also suppressing inherent noise pulses. The filtered sine wave signal is then shaped into pulses by means of a shaping circuit 26 as required to trigger the decade counter system 28 which counts the Doppler cycles for obtaining a velocity measurement.

It is necessary to provide means for connecting the Doppler signal output from the shaping circuit 26 to the counter 28 during an accurately determined time interval to obtain a suitable velocity measurement. The relationship between velocity of a moving object and the change in frequency of the reflected signal is given by the expression $$V = f_d \times \frac{c}{2f} \quad (1)$$

where $c$ is the velocity of propagation and $f$ is the frequency of the transmitted signal. Since the velocity of propagation of a wave in space is $983.6 \times 10^6$ feet per second, and the transmitter frequency is 10,000 megacycles per second, the velocity may be expressed as $$V = .04918 \, f_d \text{ feet per second} \quad (2)$$

By counting the Doppler cycles during a time interval of .04918 second, the number of cycles will be equivalent to the average velocity of the projectile in feet per second during this interval so that the counter reads directly in feet per second.

To limit the counting of the Doppler cycles to an accurately determined time interval of .04918 second, an electronic switch circuit or gate 30 is provided which is controlled by timing means, indicated generally at 34, in a manner to be hereinafter described. The gate 30 is in effect a switch which connects the Doppler signal output of the shaping circuit 26 to the counter 28 only during the desired interval of time.

The timing circuit 34 includes a highly stable crystal oscillator 36 having a nominal frequency of 100 kc., the output of which is coupled to a blocking oscillator type frequency divider circuit, indicated generally at 38. The divider circuit 38 is followed by two additional divider stages 40 and 42 of the bistable multivibrator or Eccles-Jordan type circuit.

The divider circuit 38 includes five stages 44, 46, 48, 50 and 52 (Fig. 5), each of which is a free-running-type blocking oscillator, the natural frequencies being 50 kc., 10 kc., 2 kc., 400 cycles and 80 cycles per second, respectively. Each stage is synchronized by the previous stage, the input stage 44 being controlled by the crystal oscillator 36. Further division by the two divider stages 40 and 42 reduces the frequency to 40 and 20 cycles per second, respectively, giving a time period for one cycle of nominally .05 second at the output of the last stage. Actually, the frequency of the crystal oscillator is set to give a time period of the desired .04918 second at the output of the last divider stage 42.

The blocking oscillator stages are modified somewhat from conventional design. As shown in Fig. 5, the grid resistors of all five stages are connected to a delay start gate circuit, indicated generally at 54, which operates in a manner to be hereinafter described. The delay start gate functions to trigger the blocking oscillators into operation by raising their grids to a positive potential. Because there is a time delay resulting from the grid circuit time constant of each of the blocking oscillators, to insure that the remaining oscillators start conducting at the same time, each of the last three stages 48, 50 and 52 has its plate circuit connected to the plate of a triode 56. The grid of each of the triodes 56 is biased highly negative and is capacity coupled to the common connection to the delay start gate. Thus, when the delay start gate triggers the grids positive, a positive pulse is applied to the primary of the coupling transformer 58 of each of the stages 48, 50 and 52. This pulse causes current to flow through the primary of the transformer. The plate voltage of each of the blocking oscillators drops abruptly, then rises to a value above the plate supply, and finally returns to the level of the plate supply voltage. The close coupling of the secondary of the transformers 58 results in the grids of the blocking oscillators dropping far below cutoff during this time. The return cutoff is dependent on the time constant of the grid circuits. Each oscillatory grid circuit has a larger time constant than the preceding one and is so adjusted that each oscillator is triggered on by the desired synchronizing pulse. The purpose of the delay start gate circuit 54 is to insure that the timing and counting circuits will not be triggered prematurely by aperiodic noise pulses or other transient signals.

The output signal from the shaping circuit 26 is coupled through a diode 60 to a condenser 62. Successive positive Doppler pulses charge up the condenser 62 to the point where the grid of a blocking oscillator, indicated generally at 64, is driven above cutoff, initiating a sharp peaked output pulse. The blocking oscillator output is coupled to the grid of a gas-filled triode 66, the output pulse generated by the blocking oscillator causing the triode 66 to conduct. The cathode of the gas triode 66 rises to substantially the potential of the plate supply voltage thereby triggering the frequency divider circuit 38 as explained above.

The condenser 62 discharges across a large resistor 68 so that randomly spaced noise pulses will not accumulate a charge on condenser 62 sufficient to drive the grid of the blocking oscillator 64 above cutoff. Diode 60 and inversely connected diode 70 prevent negative pulses from charging the condenser 62 negatively. As soon as the blocking oscillator triggers, grid conduction dissipates the charge on condenser 62.

Referring to Fig. 3, the step charging action of the integrating-type counter is graphically illustrated. The initial Doppler cycles received during the time $t_1$, before the flash gases obliterate the Doppler signal, are sufficient to cause the blocking oscillator stage 64 to trigger the triode 66. However, random noise pulses do not develop sufficient charge on condenser 62 to trigger the gas-triode 66. To restore triode 66 to a non-conducting condition after a velocity measurement is made, a manually operated reset switch $72_a$ is provided to break the plate circuit.

The timing circuit having been triggered, in accordance with an additional feature of the invention, triggering of the electronic switch 30 is delayed a period of time $t_2$ sufficient to permit dissipation of the flash gases. To this end, the timing pulses out of the last divider stage 42 are coupled to a four-stage binary counter, indicated generally at 74. Each stage is a conventional bistable multivibrator circuit, including two triodes which alternately conduct, and are capable of producing an output pulse for each two pulses applied to the input. In the fourth stage, however, the input is applied to one of the grids rather than the plates so that successive pulses into the fourth stage do not cause the two triodes to alternately conduct. The result is a single output pulse regardless of the number of input pulses, provided the initial conductive condition is properly established.

Although a maximum time delay of .4 second, or one pulse out for every eight pulses in, is possible, a shorter delay period is achieved by changing the initial conducting arrangement of the counter stages. A delay between the initial input pulse and single output pulse of .10 or .15 second is normally desired in firing a 90 mm. or 120 mm. gun respectively. The proper setting of the initial condition of the binary counter is obtained by means of a selector switch 76 and reset switch $72_b$. The selector switch 76 has six decks having three positions each. In addition to an off-position, the switch has a "90 mm. gun" position and a "120 mm. gun" position. Initial conditions are established by connection of the grids of each multivibrator stage directly to ground or through the reset switch $72_b$ to ground. All the tubes having their grids connected to the reset switch are made initially conductive by pushing the reset switch $72_b$ to momentarily break the connection to ground.

Reference to Fig. 4 shows the output waveform at each of the stages of the binary counter, A being the output of the last stage 42 of the divider circuit, B being the output of the first stage of the binary counter, etc. The waveforms shown are those present for a 120 mm. gun time delay. Conditions for a 90 mm. gun delay initially are the same as exist after the first pulse is received when set for a 120 mm. time delay, so that the 90 mm. delay time is reduced by a time interval equal to one pulse or approximately .05 of a second.

The output of the fourth stage is applied to the grid of a triode 80 in the prime gate circuit, indicated generally at 78, which also is a conventional bistable multivibrator circuit. The output of the divider circuit stage 42 is coupled to the grid of the other triode 82. When the reset switch $72_b$ is actuated, triode 80 is rendered conductive. When a negative pulse is received from the last stage of the binary counter, the triode 82 becomes conductive. The next successive pulse from the output divider stage 42 restores the triode 80 conductive. See Fig. 4—F.

The plate of triode 80 is coupled to the grid of triode 86 of the main gate circuit, indicated generally at 84. Triode 86 being normally made conductive by the reset switch $72_b$, the negative pulse, generated when triode 80 is rendered conductive by the input pulse from the divider stage 42, cuts off triode 86 and renders the other triode 88 of the main gate circuit conductive. However, the next successive pulse from the output stage 42 of the divider restores the main gate circuit to its initial condition with triode 86 conducting. See Fig. 4—G.

Although the wave shapes of the prime gate and main gate output signals are the same, the leading and lagging edges of the main gate square-wave signal are fixed by successive pulses from the frequency divider. The leading edge of the output signal or the prime gate circuit 78, however, is fixed by the output of the binary counter 74 and hence is subject to a finite time delay, making it too inaccurate for use as a gating voltage for the counter 28.

The output voltage of the main gate 84 is coupled to the electronic switch 30 for connecting the Doppler signal output of the shaping circuit 26 to the counter 28 for the exact duration of the positive square-wave pulse of the main gate signal. Only one main gate square-wave pulse is possible because at the end of the pulse the triode 86 is left conducting. Further negative pulses from the frequency divider output have no effect because the triode 88 is already non-conducting and no input can be applied to the triode 86 because the last stage of the binary counter 74 can no longer be triggered. The first three stages of the binary counter continue to operate, however, until the reset switch $72_b$ is opened. Thus, the counter 28 is actuated by the Doppler signal only during a .04918 second time interval.

From the above description, it will be evident that the objects of the invention have been achieved by the provision of a chronograph for measuring projectile velocity which is highly accurate and reliable. The possibility of false counts resulting from spurious signals of any kind is remote by virtue of the rate-sensitive starting circuit. Random noise will not trigger the counter, so that the chronograph can be left in a stand-by condition for any length of time, ready to take a reading whenever the gun might be fired. The counter can only be triggered by the Doppler signal generated when the projectile first emerges from the gun barrel.

The chronograph timing circuit not only controls the counter for an accurately established time interval, but delays the actual counting by a preselected time delay interval to permit dissipation of flash gases. This feature of the invention insures that an accurate velocity determination is made in the minimum time after the projectile leaves the gun. Any shorter delay time would result in spurious counts due to the flash gases; a longer time delay would not give a reading indicative of muzzle velocity.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a chronograph utilizing the Doppler principle for measuring the velocity of a projectile by counting the Doppler cycles during a fixed time interval, timing means including an integrating-type step counter responsive to a succession of cycles of the Doppler signal, a crystal-controlled oscillator, a frequency divider circuit coupled to the output of the oscillator, the output of the frequency divider being a series of pulses accurately spaced a time interval apart equal to said fixed time interval during which the Doppler cycles are counted, a grid-controlled gas tube triggered by the step counter after a predetermined number of Doppler cycles, said tube being coupled to the frequency divider circuit for biasing the frequency divider to operative condition when triggered, a four stage binary counter for producing a delayed output pulse after a preselected number of input pulses from the frequency divider circuit, a bistable multivibrator-type prime gate circuit coupled to the output of the binary counter and the frequency divider circuit, a bistable multivibrator-type main gate circuit coupled to the output of the prime gate circuit and the frequency divider circuit, and electronic switching means actuated by the main gate circuit and adapted to transmit the Doppler signal during a time interval equal to the time between successive pulses of the divider circuit.

2. In a chronograph utilizing the Doppler principle for measuring the velocity of a projectile by counting the Doppler cycles during a fixed time interval, timing means including an integrating-type step counter responsive to a succession of cycles of the Doppler signal, pulse generating means, the output of the pulse generating means being a series of pulses accurately spaced a time interval apart equal to said fixed time interval for counting the Doppler cycles, said pulse generating means being biased to operative condition by the step counter after a predetermined number of Doppler cycles, a four stage binary counter for producing a delayed output pulse after a preselected number of input pulses from the pulse generating means, a bistable multivibrator-type prime gate circuit coupled to the output of the binary counter and the pulse generating means, a bistable multi-vibrator-type main gate circuit coupled to the output of the prime gate circuit and the pulse generating means, and electronic switching means actuated by the main gate circuit and adapted to transmit the Doppler signal during a time interval equal to the time between successive pulses of the pulse generating means.

3. In a chronograph utilizing the Doppler principle for measuring the velocity of a projectile by counting the Doppler cycles during a fixed time interval, timing means including an integrating-type step counter responsive to a succession of cycles of the Doppler signal, pulse generating means, the output of the pulse generating means being a series of pulses accurately spaced a time interval apart equal to said fixed time interval for counting the Doppler cycles, said pulse generating means being biased to operative condition by the step counter after a predetermined number of Doppler cycles, means coupled to the output of the pulse generating means for producing a delayed output pulse after a preselected number of input pulses from the pulse generating means, a bistable multivibrator-type prime gate circuit coupled to the output of the delayed pulse means and the pulse generating means, a bistable multivibrator-type main gate circuit coupled to the output of the prime gate circuit and the pulse generating means, and electronic switching means actuated by the main gate circuit and adapted to transmit the Doppler signal during a time interval equal to the time between successive pulses of the pulse generating means.

4. In a chronograph utilizing the Doppler principle for measuring the velocity of a projectile by counting the Doppler cycles during a fixed time interval, timing means including an integrating-type step counter responsive to a succession of cycles of the Doppler signal, pulse generating means, the output of the pulse generating means being a series of pulses accurately spaced a time interval apart equal to said fixed time interval for counting the Doppler cycles, said pulse generating means being biased to operative condition by the step counter after a predetermined number of Doppler cycles, means coupled to the output of the pulse generating means for producing a delayed output pulse after a preselected number of input pulses from the pulse generating means, a prime gate circuit coupled to the output of the delayed pulse means and the pulse generating means, a main gate circuit coupled to the output of the prime gate circuit and the pulse generating means, and electronic switching means actuated by the main gate circuit and adapted to transmit the Doppler signal during a time interval equal to the time between successive pulses of the pulse generating means.

5. In a chronograph utilizing the Doppler principle for measuring the velocity of a projective by counting the Doppler cycles during a fixed time interval, timing means including an integrating-type step counter responsive to a succession of cycles of the Doppler signal, pulse generating means the output of which is a series of pulses accurately spaced a time interval apart equal to said fixed time interval for counting the Doppler cycles, said pulse generating means being biased to operative condition by the step counter after a predetermined number of Doppler cycles, means coupled to the output of the pulse generator for producing a delayed output pulse after a preselected number of input pulses from the pulse generating means, gate means responsive to the output of the delayed pulse means and the pulse generating means, said gate means being actuated a delayed interval after the initial output pulse of the pulse generating means, and electronic switching means actuated by said gate means and adapted to transmit the Doppler signal during a time interval equal to the time between successive pulses of the pulse generating means.

6. In a chronograph utilizing the Doppler principle for measuring the velocity of a projectile by counting the Doppler cycles during a fixed time interval, timing means including rate-sensitive means responsive to a succession of cycles of the Doppler signal, pulse generating means the output of which is a series of pulses accurately spaced a time interval apart equal to said fixed time interval for counting the Doppler cycles, said pulse generating means being biased to operative condition by the rate-sensitive means after a predetermined number of Doppler cycles, means coupled to the output of the pulse generator for producing a delayed output pulse after a preselected number of input pulses from the pulse generator, gate means responsive to the output of the delayed pulse means and the pulse generating means, said gate means being actuated a delayed interval after the initial output pulse of the pulse generating means, and electronic switching means actuated by said gate means and adapted to transmit the Doppler signal during a time interval equal to the time between successive pulses of the pulse generating means.

7. A chronograph for measuring the velocity of a projectile fired from a gun, said chronograph including high frequency radio transmitting means, receiving means for receiving the radio signal reflected from the projectile after it leaves the gun, said receiver means producing a Doppler signal having a frequency equal to the difference between the frequency of the transmitted and reflected radio signals as determined by the velocity of the projectile, counter means for counting the individual cycles in the Doppler signal, electronic switching means for coupling the counter means to the output of said receiver means, and integrating-type step counter responsive to a succession of Doppler signal cycles within the frequency range normally produced by a high velocity projectile, and a crystal-controlled timing circuit triggered by said step counter, said timing circuit producing a square wave output pulse of accurately timed duration and delayed a preselected time interval after triggering of the timing circuit by said step counter, the output of the timing circuit being coupled to the electronic switching means whereby the counter means is actuated by the output of the receiver means for a predetermined time interval.

8. A chronograph for measuring the velocity of a projectile fired from a gun, said chronograph including high frequency radio transmitting means, receiving means for receiving the radio signal reflected from the projectile after it leaves the gun, said receiver means producing a Doppler signal having a frequency equal to the difference between the frequency of the transmitted and reflected radio signals as determined by the velocity of the projectile, counter means for counting the individual cycles in the Doppler signal, electronic switching means for coupling the counter means to the output of said receiver means, rate-sensitive means responsive to a succession of Doppler signal cycles within the frequency range normally produced by a high velocity projectile, and timing means triggered by said rate-sensitive means, the output of the timing means being coupled to the electronic switching means whereby the counter means is actuated by the output of the receiver means for a predetermined time interval.

9. A chronograph for measuring the velocity of a projectile fired from a gun, said chronograph including high frequency radio transmitting means, receiving means for receiving the radio signal reflected from the projectile after it leaves the gun, said receiver means producing a Doppler signal having a frequency equal to the difference between the frequency of the transmitted and reflected radio signals as determined by the velocity of the projectile, counter means for counting the individual cycles in the Doppler signal, electronic switching means for coupling the counter means to the output of said receiver means, an integrating-type step counter responsive to a succession of Doppler signal cycles within the frequency range normally produced by a high velocity projectile, and timing means triggered by said step counter, said timing means being coupled to the electronic switching means for controlling the time interval during which the output of the receiver means is fed to the counter means.

10. A chronograph utilizing the Doppler principle in which the cycles of the Doppler signal are counted for a fixed time interval, said chronograph including an integrating-type step counter responsive to the Doppler signal frequency for initiating a measurement cycle, a crystal oscillator, a frequency divider triggered by said step counter after a predetermined number of Doppler signal cycles, the period of the output signal of said frequency divider being equal to said fixed time interval, a four stage binary counter triggered by the output signal of said frequency divider, a bistable multivibrator-type prime gate circuit triggered to one phase by the output pulses from said binary counter and restored to the initial phase by the next successive output pulse of the frequency divider, and a bistable multivibrator-type main gate circuit triggered to one phase by the output of the prime gate circuit simultaneously with the phase reversal initiated by one of the output pulses of the frequency divider and restored to the initial phase by the next successive frequency divider pulse whereby said main gate circuit is tripped to one phase for an exact period limited by two successive output pulses of the frequency divider and at an interval of time after the frequency divider is triggered as determined by the binary counter.

11. A chronograph utilizing the Doppler principle in which the cycles of the Doppler signal are counted for a fixed time interval, said chronograph including means for initiating a measurement cycle, pulse generating means triggered by said initiating means, the period of the output signal of said pulse generating means being equal to said fixed time interval, means for producing an output pulse a predetermined time interval after an initiating input pulse and triggered by the output signal of said pulse generating means, a bistable multi-vibrator-type prime gate circuit triggered to one phase by the output pulse from said last named means and restored to the initial phase by the next successive output pulse of the pulse generating means, and a bistable multivibrator-type main gate circuit triggered to one phase by the output of the prime gate circuit simultaneously with the phase reversal initiated by one of the output pulses of the pulse generating means and restored to the initial phase by the next successive pulse whereby said main gate circuit is tripped to one phase for an exact period limited by two successive output pulses of the pulse generating means and a predetermined interval of time after the pulse generating means is triggered.

12. In combination with apparatus for counting successive cycles of a periodic input signal, timing means for accurately initiating and terminating a counting time interval, said timing means comprising pulse generating means, means responsive to a succession of cycles of said periodic signal for triggering said pulse generating means, means coupled to the output of said pulse generating means for producing a delayed output pulse after a predetermined number of input pulses, first gate means triggered on by said delayed pulse and off again by the next successive output pulse of said generating means, second gate means triggered on simultaneously with the triggering off of said first gate means and triggered off by the next successive output pulse of said pulse generating means, and electronic switching means actuated by said second gate means for transmitting said periodic input signal during the interval said second gate is triggered on.

13. In combination with apparatus for counting successive cycles of a periodic input signal, timing means for accurately initiating and terminating a counting time interval, said timing means comprising crystal-controlled pulse generating means, an integrating-type step counter responsive to a succession of cycles of said input signal, the counter triggering the pulse generating means only after receiving a predetermined number of cycles of the input signal, an adjustable time delay means coupled to the output of said pulse generating means for producing a delayed output pulse a preselected time interval after the initial output pulse of said pulse generating means, and electronic gating means coupled to the output of the time delay means and the output of the pulse generating means, said electronic gating means being primed by the output of the time delay means and triggered on and then off by the next two successive pulses from the pulse generating means.

14. In combination with apparatus for counting successive cycles of a periodic input signal, timing means for accurately initiating and terminating a counting time interval, said timing means comprising pulse generating means, an adjustable time delay means coupled to the output of said pulse generating means for producing a delayed output pulse a preselected time interval after the initial output pulse of said pulse generating means, and electronic gating means coupled to the output of the time delay means and the output of the pulse generating means, said electronic gating means being primed by the output of the time delay means and then triggered on and then off by the next two successive pulses from the pulse generating means.

15. A chronograph for measuring the velocity of a projectile fired from a gun, said chronograph including high frequency radio transmitting means, receiving means for receiving the radio signal reflected from the projectile after it leaves the gun, said receiver means producing a Doppler signal having a frequency equal to the difference between the frequency of the transmitted and reflected radio signals as determined by the velocity of the projectile, counter means for counting the individual cycles in the Doppler signal, electronic switching means for coupling the counter means to the output of said receiver means, means responsive to the initiation of travel of the projectile, and timing means triggered by said last named means, the output of the timing means being coupled to the electronic switching means whereby the counter means is actuated by the output of the receiver means for a predetermined time interval.

16. A chronograph for measuring the velocity of a projectile fired from a gun, said chronograph including high frequency radio transmitting means, receiving means for receiving the radio signal reflected from the projectile after it leaves the gun, said receiver means producing a Doppler signal having a frequency equal to the difference between the frequency of the transmitted and reflected radio signals as determined by the velocity of the projectile, counter means for counting the individual cycles in the Doppler signal, rate-sensitive means responsive to a succession of Doppler signal cycles within the frequency range normally produced by a high velocity projectile, and timing means triggered by said rate-sensitive means, the output of the timing means controlling the receiving and counter means whereby the counter means is actuated by the output of the receiver means for a predetermined time interval.

17. A chronograph for measuring the initial velocity of a projectile, said chronograph comprising a high frequency transmitter-receiver means for producing an alternating current output signal having a frequency proportional to the projectile velocity, counting circuit means responsive to said output signal for registering the number of cycles in a train of waves of said output signal, and timing means triggered by the initial movement of the projectile and including means for retaining the counting circuit means inactive for a predetermined time interval after initiation of the travel of the projectile, and means for activating said counting circuit means for a second predetermined time interval.

References Cited in the file of this patent

UNITED STATES PATENTS

| | | |
|---|---|---|
| 2,414,479 | Miller | Jan. 21, 1947 |
| 2,524,610 | Storm et al. | Oct. 3, 1950 |
| 2,560,124 | Mofenson | July 10, 1951 |